United States Patent
Minder et al.

(10) Patent No.: US 6,917,931 B2
(45) Date of Patent: Jul. 12, 2005

(54) SOFTWARE AND METHOD FOR PERFORMING DATABASE OPERATIONS

(75) Inventors: Sharon E. Minder, Delray Beach, FL (US); Teresa M. Beck, Sunrise, FL (US)

(73) Assignee: International Business Machines Corporation, Armonk, NY (US)

( * ) Notice: Subject to any disclaimer, the term of this patent is extended or adjusted under 35 U.S.C. 154(b) by 253 days.

(21) Appl. No.: 09/896,778

(22) Filed: Jun. 29, 2001

(65) Prior Publication Data

US 2003/0004930 A1 Jan. 2, 2003

(51) Int. Cl.[7] .............................................. G06F 17/30
(52) U.S. Cl. ............................ 707/2; 707/5; 707/104.1
(58) Field of Search ...................... 707/1–10, 100–104.1, 707/200–206

(56) References Cited

U.S. PATENT DOCUMENTS

| | | | |
|---|---|---|---|
| 4,309,756 A | | 1/1982 | Beckler ........................ 717/155 |
| 5,546,570 A | * | 8/1996 | McPherson et al. ........... 707/4 |
| 5,619,688 A | | 4/1997 | Bosworth et al. ............... 707/4 |
| 5,666,526 A | | 9/1997 | Reiter et al. .................... 707/2 |
| 5,802,512 A | | 9/1998 | Wallack .......................... 707/2 |
| 5,940,819 A | * | 8/1999 | Beavin et al. ................... 707/2 |
| 5,974,418 A | | 10/1999 | Blinn et al. ................... 707/100 |
| 6,009,422 A | * | 12/1999 | Ciccarelli ....................... 707/4 |
| 6,345,267 B1 | * | 2/2002 | Lohman et al. ................. 707/2 |
| 6,453,313 B1 | * | 9/2002 | Klein et al. ..................... 707/3 |
| 6,516,312 B1 | * | 2/2003 | Kraft et al. ..................... 707/3 |
| 6,629,091 B1 | * | 9/2003 | Miura et al. .................... 707/2 |
| 6,671,681 B1 | * | 12/2003 | Emens et al. ................... 707/5 |
| 6,704,748 B1 | * | 3/2004 | Suganuma ............... 707/104.1 |

* cited by examiner

*Primary Examiner*—Shahid Alam
*Assistant Examiner*—Jean Bolte Fleurantin
(74) *Attorney, Agent, or Firm*—Richard A. Tomlin; Stephen Bongini; Fleit, Kain, Gibbons, Gutman, Bongini & Bianco P.L.

(57) ABSTRACT

Elements of one or more database manipulation language (DML) commands strings are stored in tables, read from those tables and DML commands are generated. Storing these command elements in tables facilitates access to and modification of database commands used in data processing applications. Temporary storage control elements are also stored in and read from those tables. The DML query command string is executed, the retrieved data is stored in temporary storage as specified by the temporary storage control elements and is bound to the parameters to the DML storage command strings which are executed to modify target database tables.

30 Claims, 19 Drawing Sheets

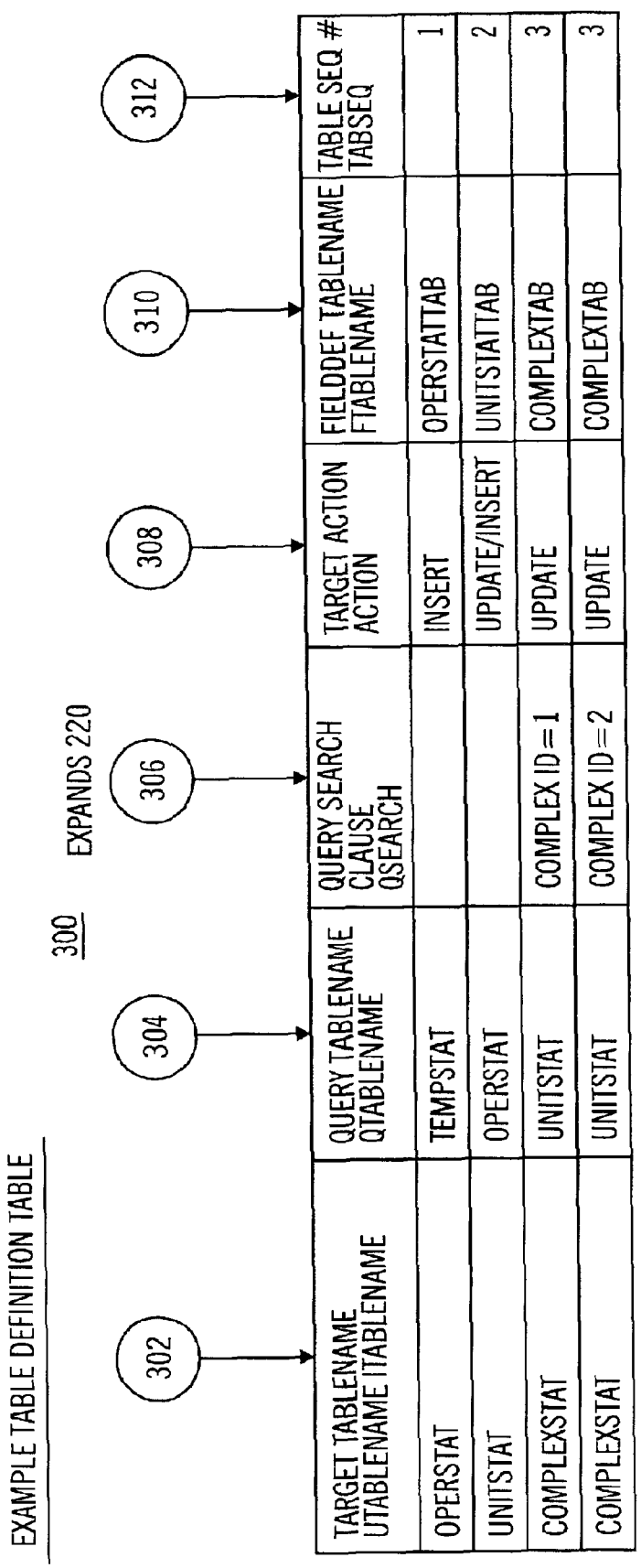

FIG. 3

EXAMPLE TABLE DEFINITION TABLE
300   EXPANDS 220

| TARGET TABLENAME UTABLENAME ITABLENAME | QUERY TABLENAME QTABLENAME | QUERY SEARCH CLAUSE QSEARCH | TARGET ACTION ACTION | FIELDDEF TABLENAME FTABLENAME | TABLE SEQ # TABSEQ |
|---|---|---|---|---|---|
| OPERSTAT | TEMPSTAT | | INSERT | OPERSTATTAB | 1 |
| UNITSTAT | OPERSTAT | | UPDATE/INSERT | UNITSTATTAB | 2 |
| COMPLEXSTAT | UNITSTAT | COMPLEX ID = 1 | UPDATE | COMPLEXTAB | 3 |
| COMPLEXSTAT | UNITSTAT | COMPLEX ID = 2 | UPDATE | COMPLEXTAB | 3 |

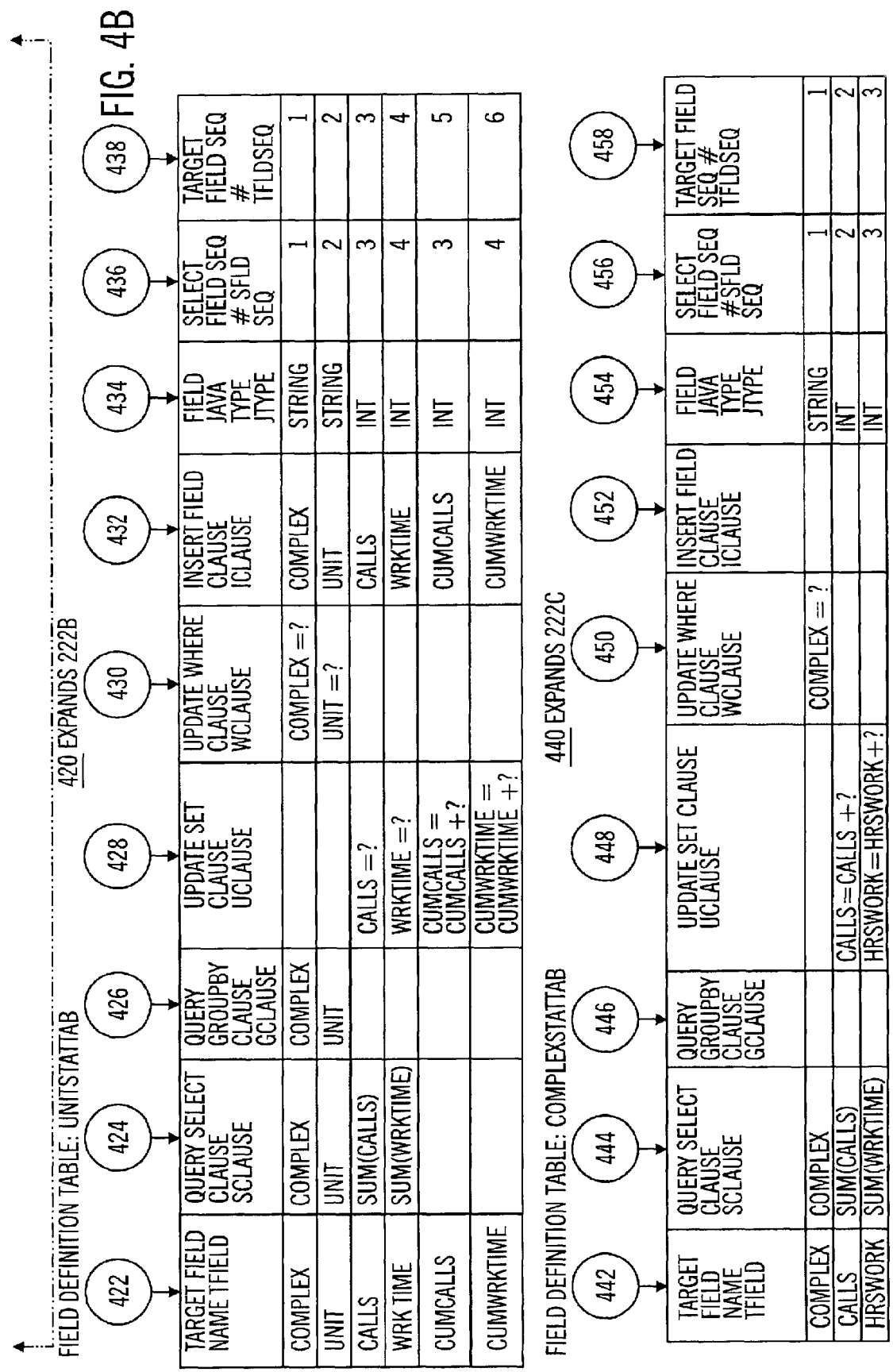

Select SCLAUSE, JTYPE, SFLDSEQ FROM UnitStatTab WHERE SCLAUSE is NOT NULL ORDER BY SFLDSEQ ⟵ 550

```
i=1
While not end of resultset
{
// Get values from next row of resultset
  SClause[i] = GetString [1]      // get SCLAUSE
  SJType[i]  = GetString [2]      // get JTYPE      ⟵ 551
  SFldSeq[i] = GetInt [3]         // get SFldSeq
  i++
}
Ssize = i--:
```

FIG. 5B1

| Complex | String | 1 |
|---|---|---|
| Unit | String | 2 |
| SUM(Calls) | int | 3 |
| SUM (WrkTime) | int | 4 |

RESULT SET

FIG. 5B2

Int SFldSeq [ ]

| 1 | 2 | 3 | 4 |
|---|---|---|---|

String SJtype [ ]

| String | String | int | int |
|---|---|---|---|

String SClause [ ]

| Complex | Unit | SUM(Calls) | SUM (WrkTime) |
|---|---|---|---|

Select GCLAUSE, SFLDSEQ FROM UnitStatTab WHERE GCLAUSE is NOT NULL ORDER BY SFLDSEQ  ⟵ 556
```
i=1
While not end of resultset
{
// Get values from next row of resultset
  GClause[i] = GetString [i]         // get GCLAUSE  ⟵ 557
  i++
}
Gsize = i--:
```
FIG. 5B3
SELECT GCLAUSE, SFLDSEQ FROM UnitStatTab WHERE GCLAUSE is NOT NULL ORDER BY SFLDSEQ
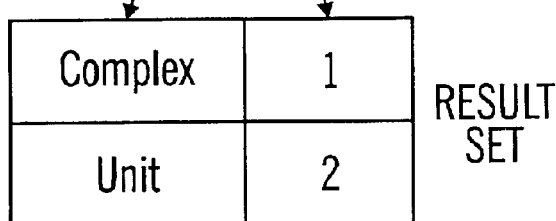
| Complex | 1 |
|---------|---|
| Unit    | 2 |
RESULT SET
String GClause [ ]
| Complex | Unit |
|---------|------|
FIG. 5B4

SELECT UCLAUSE, JTYPE, SFLDSEQ, TFLDSEQ FROM UnitStatTab WHERE /— 565
          UCLAUSE is NOT NULL ORDER BY TFLDSEQ

```
i=1
While not end of resultset
{
// Get values from next row of resultset
UClause[i] = GetString [1]        // get UCLAUSE
UJType[i]  = GetString [2]        // get JTYPE        — 566
USFldSeq[i] = GetInt [3]          // get SFldSeq
UFldseq[i] = i                    // reset sequence
i++
}
Usize = i--:
```

FIG. 5C1

SELECT UCLAUSE, JTYPE, SFLDSEQ, TFLDSEQ FROM UnitStatTab WHERE UCLAUSE
              is NOT NULL ORDER BY TFLDSEQ

| Calls=? | int | 3 | 3 |
|---|---|---|---|
| WrkTime=? | int | 4 | 4 |
| CumCalls=<br>CumCalls+? | int | 3 | 5 |
| CumWrkTime=<br>CumWrkTime+? | int | 4 | 6 |

RESULT SET

Int UFldSeq [ ]

| 1 | 2 | 3 | 4 |
|---|---|---|---|

Int USFldSeq [ ]

| 3 | 4 | 3 | 4 |
|---|---|---|---|

String UJtype [ ]

| int | int | int | int |
|---|---|---|---|

String UClause [ ]

| Calls=? | WrkTime=? | CumCalls=<br>CumCalls+? | CumWrkTime=<br>CumWrkTime+? |
|---|---|---|---|

FIG. 5C2

```
                                                          ┌─574
SELECT WCLAUSE, SFLDSEQ, TFLDSEQ FROM UnitStatTab WHERE
                    WCLAUSE is NOT NULL ORDER BY TFLDSEQ
i=1
While not end of resultset
{
// Get values from next row of resultset
WClause[i] = GetString [1]           // get WCLAUSE
WJType[i]  = GetString [2]           // get JTYPE      ──575
WSFldSeq[i] = GetInt [3]             // get SFldSeq
WFldseq[i] = Usize + i               // reset sequence
i++
}
Wsize = i--:
```
FIG. 5C3
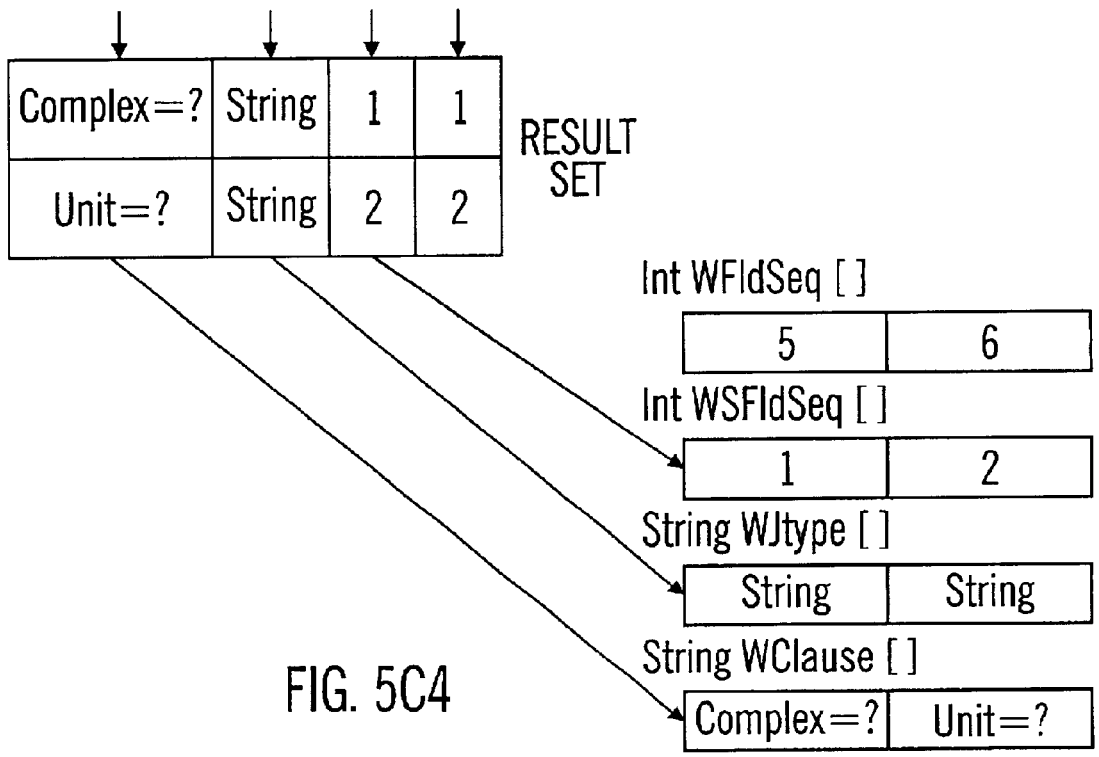
FIG. 5C4

SELECT ICLAUSE, JTYPE, SFLDSEQ, TFLDSEQ FROM UnitStatTab WHERE ICLAUSE is NOT NULL ORDER BY TFLDSEQ — 580
```
i=1
While not end of resultset
{
// Get values from next row of resultset
   IClause[i] = GetString [1]      // get ICLAUSE
   IJType[i]  = GetString [2]      // get JTYPE       — 581
   ISFldSeq[i] = GetInt [3]        // get SFldSeq
   IFldseq[i] = i                  // reset sequence
   i++
}
Isize = i--;
```
FIG. 5D1
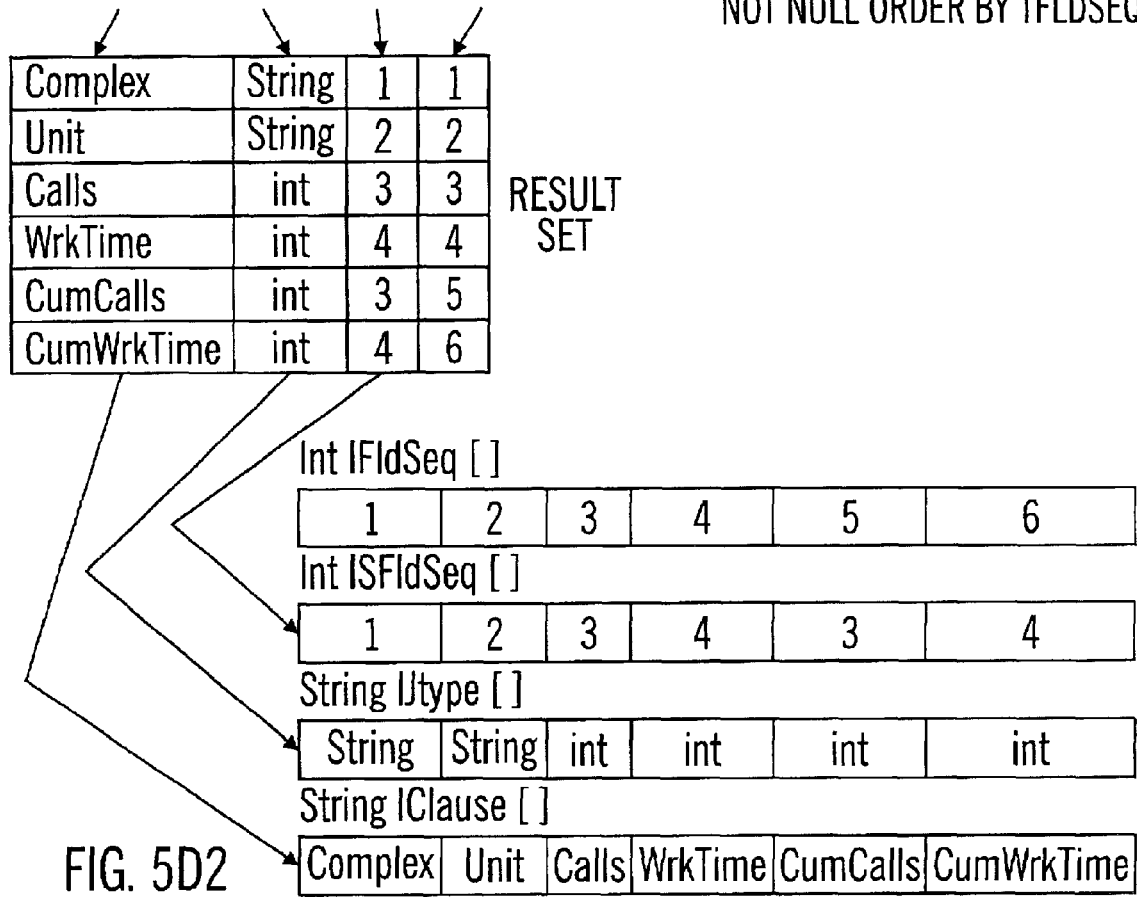
FIG. 5D2

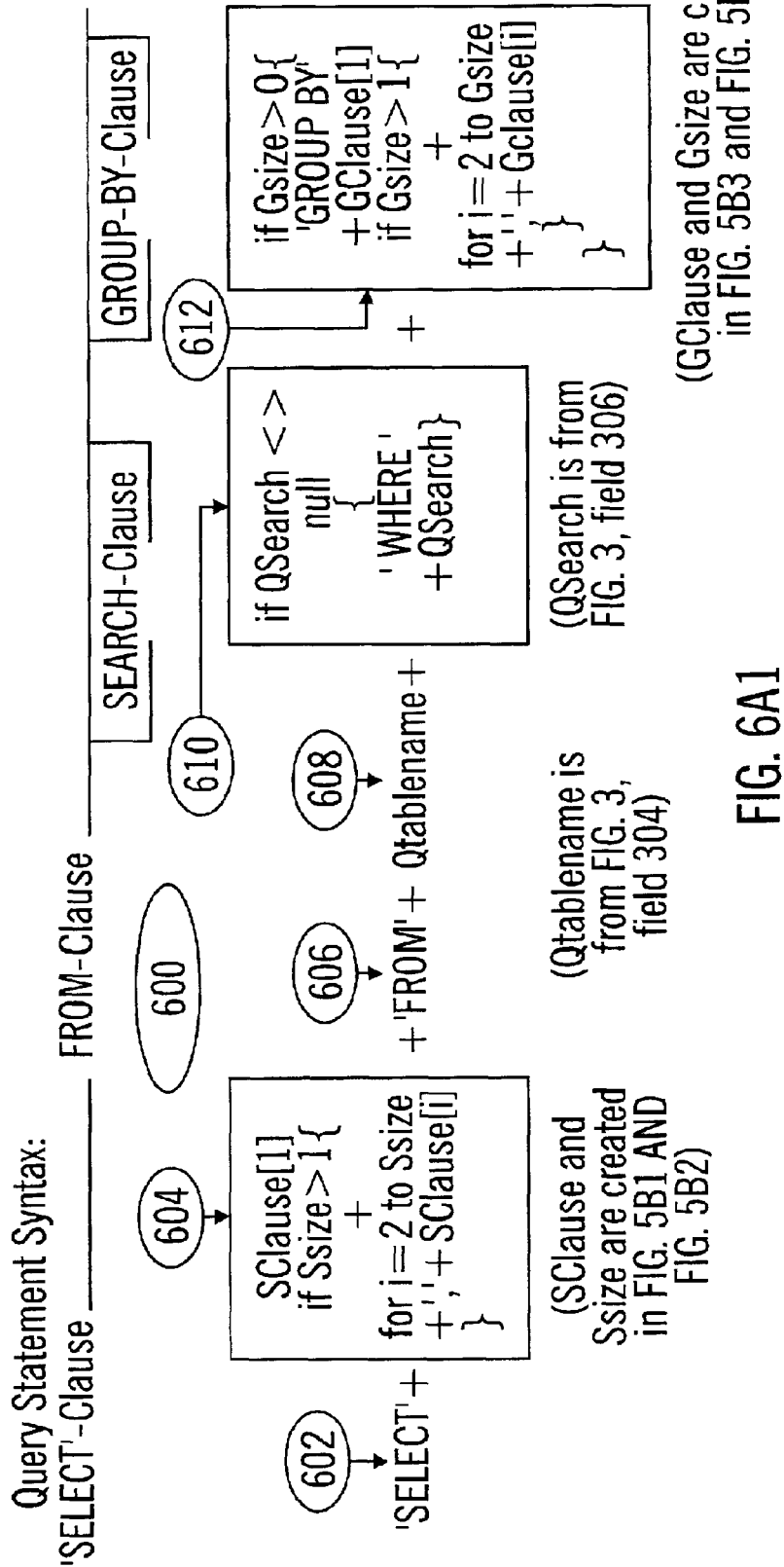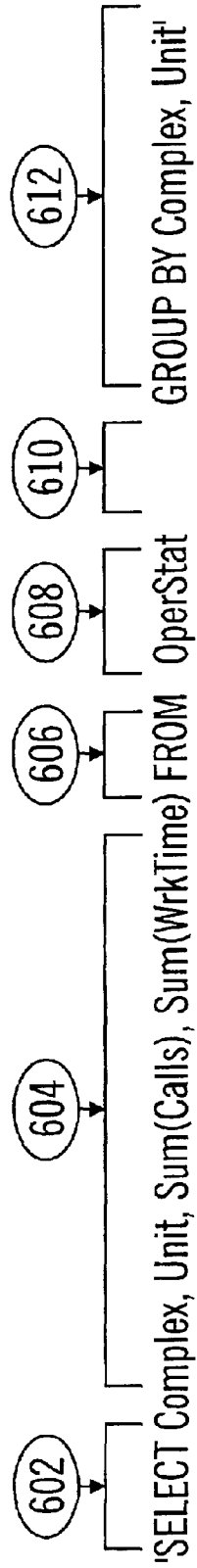
FIG. 6A1
FIG. 6A2

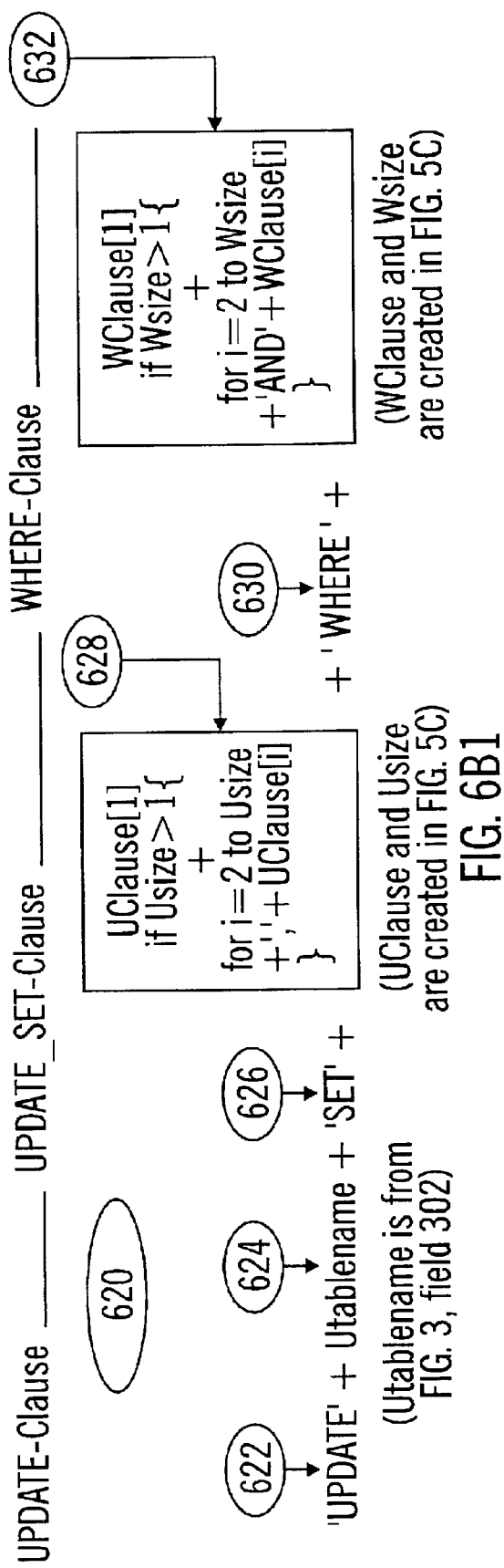
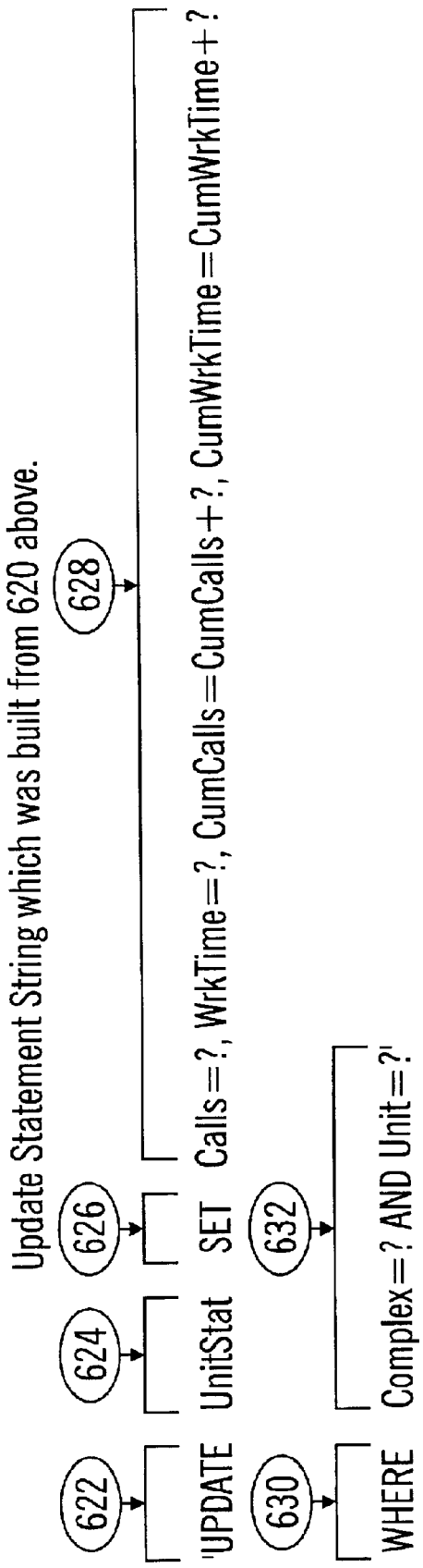
FIG. 6B1
FIG. 6B2

Insert Statement Syntax:
INSERT-Clause ───── INSERT_FIELD-Clause ───── VALUES-Clause
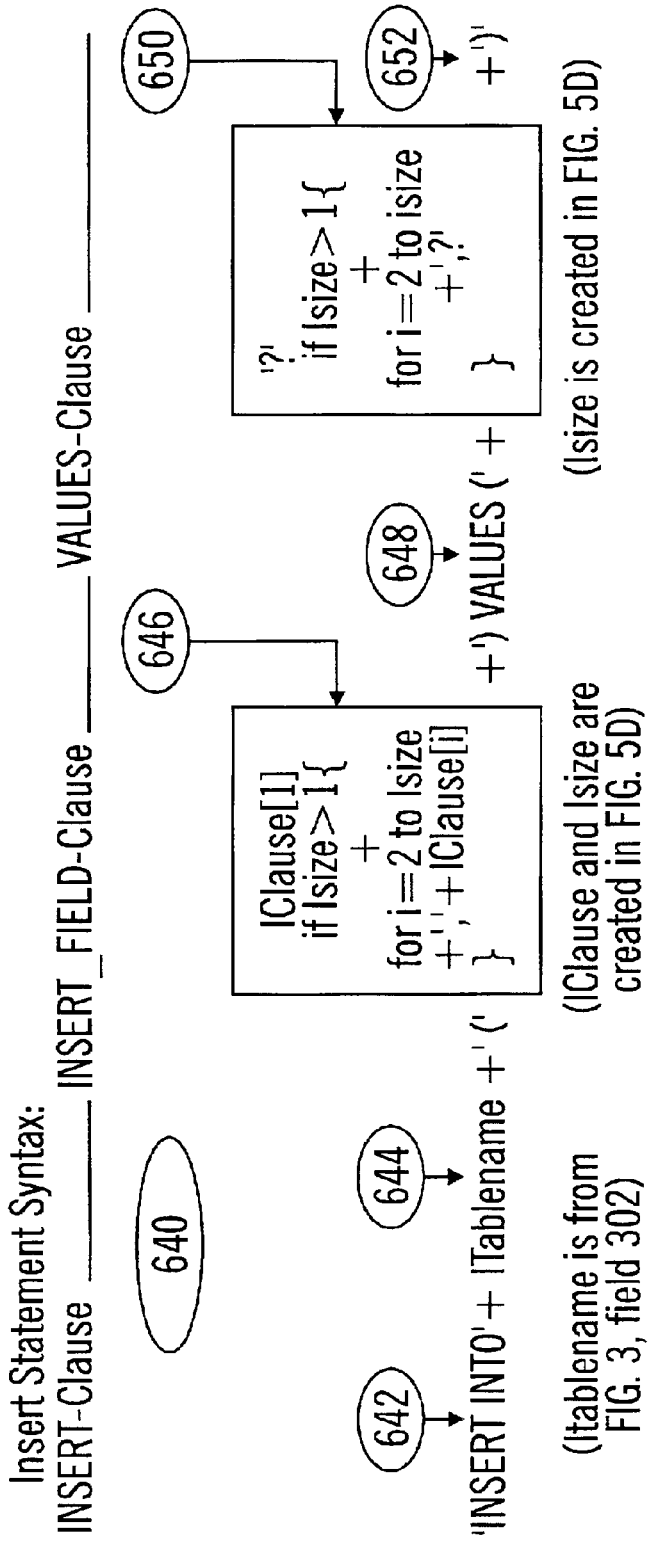
FIG. 6C1
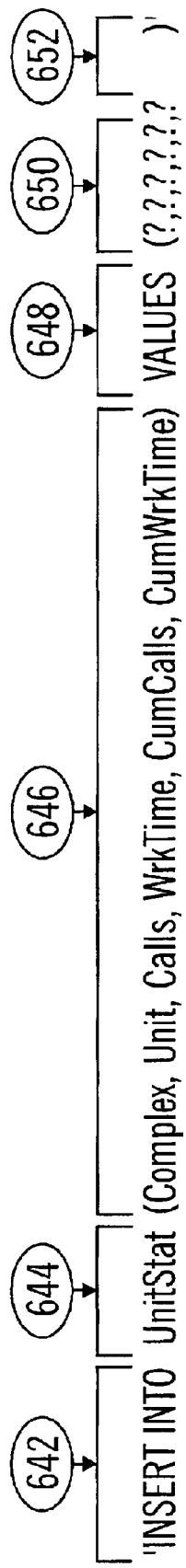
Insert Statement String which was built from 640 above.
FIG. 6C2

'SELECT Complex, Unit, Sum(Calls), Sum(WrkTime) FROM OperStat  
GROUP BY Complex, Unit' /—550

```
For i=1 to Ssize
{
  j=SFldSeq[i]
  if SJType[i]='String'
     StringRS[j]=GetString[i]
  else
     IntRS[j]=Getint[i]
}
```

Internal Data Structures

'UPDATE UnitStat SET Calls=?, WrkTime=?, CumCalls=CumCalls+?,
                    U1            U2                    U3
                                    CumWrkTime=CumWrkTime+?
                                                U4
WHERE Complex=? AND Unit=?'
        U5              U6

```
For i=1 to Usize
{
  j=UFldSeq[i]
  k=USFldSeq[i]
  if UJType[i]='String'
    setString[j]=StringRS[k]
  else
    setint[j]=IntRS[k]
}
```

FIG. 8A1

```
For i=1 to Wsize
{
  j=WFldSeq[i]
  k=WSFldSeq[i]
  if WJType[i]='String'
    setString[j]=StringRS[k]
  else
    setint[j]=IntRS[k]
}
```

FIG. 8A2

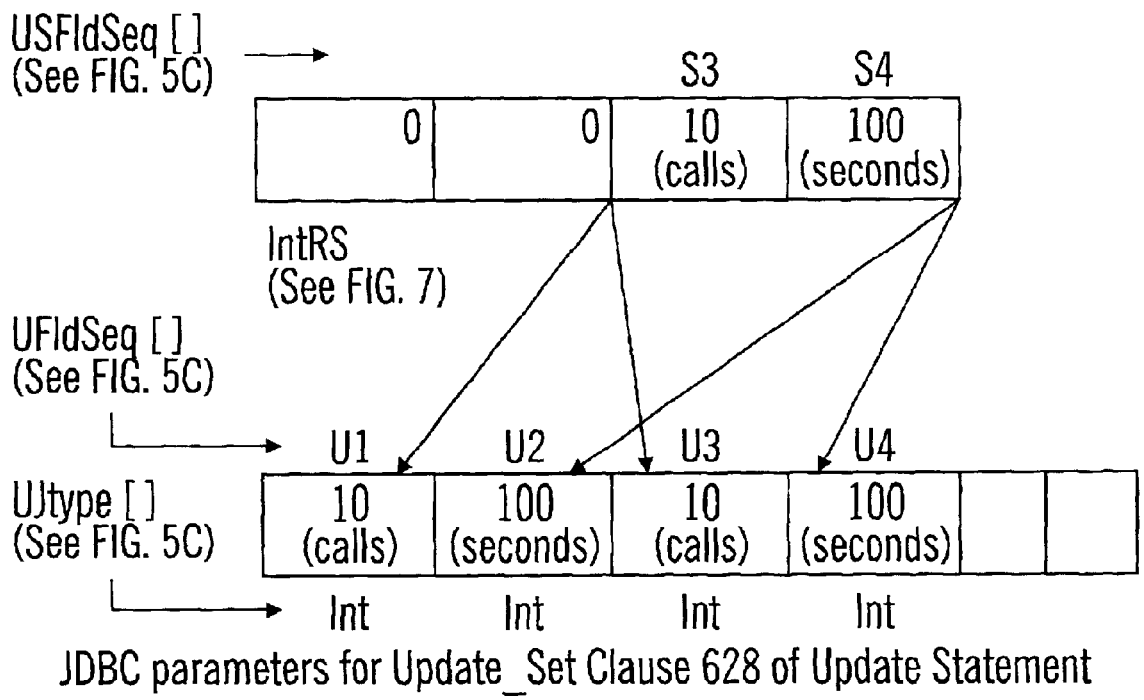
FIG. 8A3
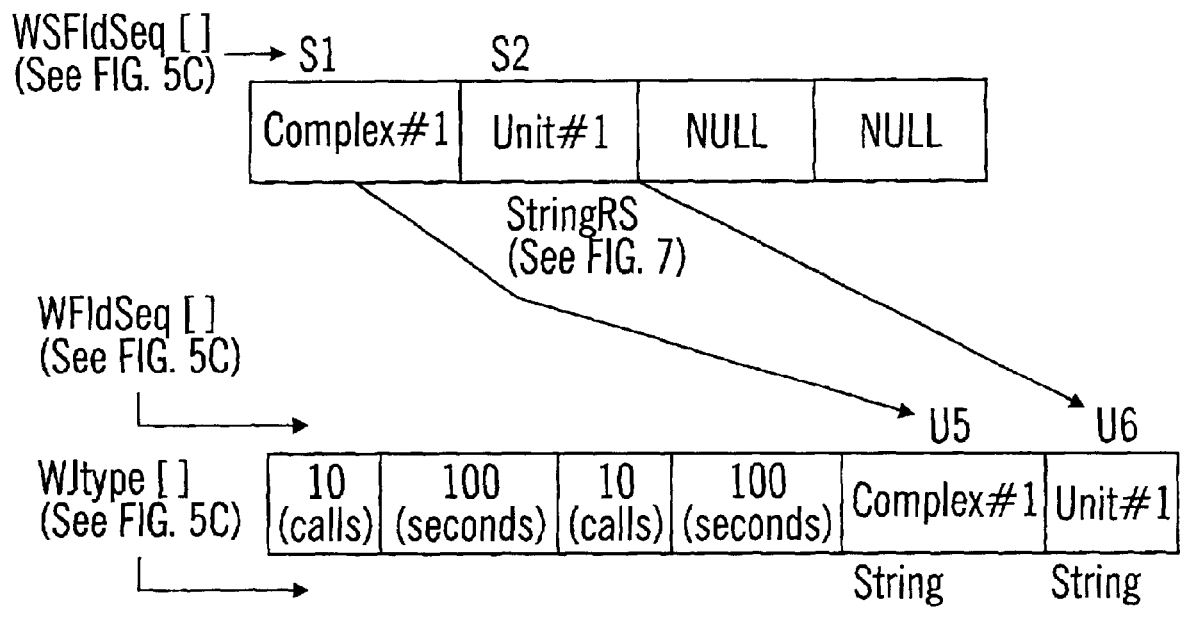
FIG. 8A4

```
'INSERT INTO UnitStat(Complex, Unit, Calls, WrkTime, CumCalls,
CumWrkTime) VALUES (?,?,?,?,?,?)'
                        I1,I2,I3,I4,I5,I6

For i=1 to Isize
{
  j=IFldSeq[i]
  k=ISFldSeq[i]
  if IJType[i]='String'
    setString[j]=StringRS[k]
  else
    setint[j]=IntRS[k]
}
```

JDBC parameters for Values Clause 650 of Insert Statement

US 6,917,931 B2

SOFTWARE AND METHOD FOR PERFORMING DATABASE OPERATIONS

PARTIAL WAIVER OF COPYRIGHT

All of the material in this patent application is subject to copyright protection under the copyright laws of the United States and other countries. As of the first effective filing date of the present application, this material is protected as unpublished material. However, permission to copy this material is hereby granted to the extent that the copyright owner has no objection to the facsimile reproduction by anyone of the patent documentation or patent disclosure, as it appears in the United States Patent and Trademark Office patent file or records, but otherwise reserves all copyright rights whatsoever.

BACKGROUND OF THE INVENTION

1. Field of the Invention

The present invention relates to databases, and more specifically to software, systems, and methods for improving the accessibility of databases.

2. Description of Related Art

Databases, including relational databases in which data is stored in a plurality of interrelated tables, are one of the cornerstones of information technology. A relational database is composed of a number of interrelated tables. A relational database is characterized by a schema, which is a set of interrelationships between its component tables. The dominant standard for database querying languages is the Structured Query Language (SQL). The Data Manipulation Language (DML) component of SQL includes the following query language commands: SELECT, UPDATE, INSERT, and DELETE. These core commands which appear in numerous variations are used to specify how data in an SQL relational database is to be manipulated.

Sequences of SQL commands can be arranged in SQL scripts and processed by an SQL database application. As an alternative to SQL scripts, some database applications provide an Application Program Interface (API) that allows an external program to issue an SQL query to the database application. The external applications can include the SQL query within its compiled code. The drawback of including SQL queries in compiled code is that programming skill and time are required to make any needed modifications. Certain new programming technologies such as the Java Database Connectivity (JDBC) package for Java (by Sun Microsystems of Palo Alto, Calif.) allow an SQL query that is stored as a string to be passed to a database application for execution, and for results to be returned for processing by a Java program.

A SQL query can be quite complicated, involving a number of command tokens, and a number of arguments interspersed between the command tokens. Moreover, a process of extracting data from a database often involves a series of interrelated queries. When making changes to complicated interrelated series of SQL queries, careful attention must be paid to the rules of syntax. The task of editing a large set of complicated interdependent SQL queries is time consuming and requires a high level of expertise.

One application of relational databases that often calls for the use of such a series of interrelated queries is data mining. A data mining application can be used to extract useful information from a very large amount of raw data. For example, a data mining application can be run on the large amount of data that is generated by computers monitoring operator assistance calls, in order to generate useful information such as call statistics.

SUMMARY OF THE INVENTION

The present invention provides a method and machine readable medium with a program that allows table driven data access and data manipulation of data stored in relational database tables. The present invention provides a method that reads a first plurality of elements of a query from a first set of one or more tables and then assembles a database query string from that first plurality of elements. The present invention may optionally read a second plurality of elements of a query from a second set of one or more tables and then assemble a data base table storage command string from that second plurality of elements. The database table storage command string maybe used to store data that was retrieved by executing the query string. The order in which the data base table storage command string stores the data may also be defined by the first and second plurality of elements.

BRIEF DESCRIPTION OF THE DRAWINGS

FIG. 3 is an example Table Definition Table according to one embodiment of the present invention.

FIG. 5B1 illustrates an example SELECT clause used to read an example Field Definition Table and a portion of the processing performed to extract data from the resulting result set used to construct a SELECT clause for one or more source data tables.

FIG. 5B2 diagrammatically illustrates the processing performed on the result set data that is defined in FIG. 5B1.

FIG. 5B3 shows another example SELECT clause used to retrieve data from a Field Definition Table and a portion of the processing performed to extract data from the resulting result set that is used to construct the Group-By clause within the SELECT command for one or more source data tables.

FIG. 5B4 diagrammatically illustrates the processing performed on the result set data that is defined in FIG. 5B3.

FIG. 5C1 illustrates an example SELECT clause used to read an example Field Definition Table and a portion of the processing performed to extract the data from the resulting result set in order to construct the SET clause within the UPDATE command to be executed on a target data table.

FIG. 5C2 diagrammatically illustrates the processing performed on the result set data that is defined in FIG. 5C1.

FIG. 5C3 shows another example SELECT clause used to retrieve data from a Field Definition Table and a portion of the processing performed to extract data from the resulting result set that is used to construct the WHERE clause within the UPDATE command to be executed on a target data table.

FIG. 5C4 diagrammatically illustrates the processing performed on the result set data that is defined in FIG. 5C3.

FIG. 5D1 illustrates an example SELECT clause used to read an example Field Definition Table and a portion of the processing performed to extract the data from the resulting result set in order to build an INSERT command to be executed on a target data table.

FIG. 5D2 diagrammatically illustrates the processing performed on the result set data that is defined in FIG. 5D1.

FIG. 6A1 is a pseudo code schematic of a process for constructing a SELECT query string from the contents of tables according to an exemplary embodiment of the present invention.

FIG. 6A2 is an example SELECT string constructed according to FIG. 6A1.

FIG. 6B1 is a pseudo code schematic of a process for constructing an UPDATE command string from the contents of tables according to an exemplary embodiment of the present invention.

FIG. 6B2 is an example UPDATE string constructed according to FIG. 6B1.

FIG. 6C1 is pseudo code schematic of a process for constructing an INSERT command string from the contents of tables according to an exemplary embodiment of the present invention.

FIG. 6C2 is an example INSERT string constructed according to FIG. 6C1.

FIG. 8A1, FIG. 8A2, FIG. 8A3 and FIG. 8A4 illustrate the processing used to bind the parameters of the Update Command string to the data stored in the internal data structures created with the processing illustrated in FIG. 7A and FIG. 7B.

DETAILED DESCRIPTION OF PREFERRED EMBODIMENTS

Objects, features, and advantages of the present invention will become apparent from the following detailed description. It should be understood, however, that the detailed description and specific examples, while indicating preferred embodiments of the present invention, are given by way of illustration only and various modifications may naturally be performed without deviating from the present invention.

Figure 1:
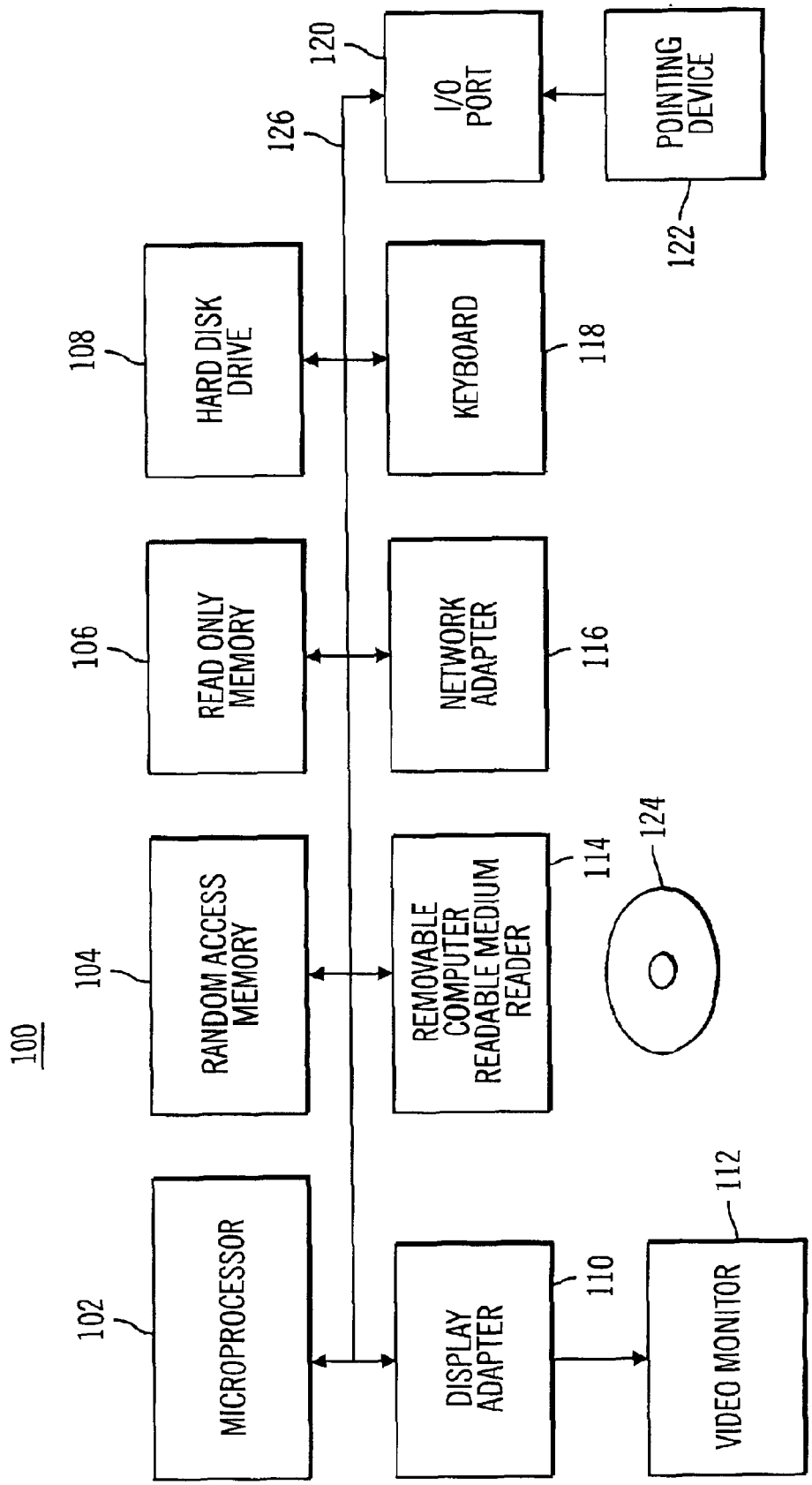
FIG. 1 is a block diagram of an exemplary computer system that can be used in practicing the present invention.

The present invention can be carried out using a programmed general purpose computer. FIG. 1 is a block diagram of such a computer 100 that can be used in practicing the present invention. The computer 100 includes a microprocessor 102, Random Access Memory (RAM) 104, Read Only Memory (ROM) 106, a data storage device in the form of a hard disk drive 108, a display adapter 110 (e.g., a video card), a removable computer-readable medium reader 114, a network adapter 116, keyboard 118, and an I/O port 120 that is communicatively coupled to a digital signal bus 126. A video monitor 112 is coupled to the display adapter 110 for receiving a video signal. A pointing device 122 such as a mouse is coupled to the I/O port 120 that receives signals generated by user operation of the pointing device 122. According to one embodiment, the network adapter 116 is used to communicatively couple the computer to an external source of data (e.g., a remote server). The computer-readable medium reader 114 can comprise a Compact Disk (CD) drive. A removable computer-readable medium 124 is provided for loading software 124 onto the computer 100 to configure the computer 100 to carry out desired processes.

Figure 2:
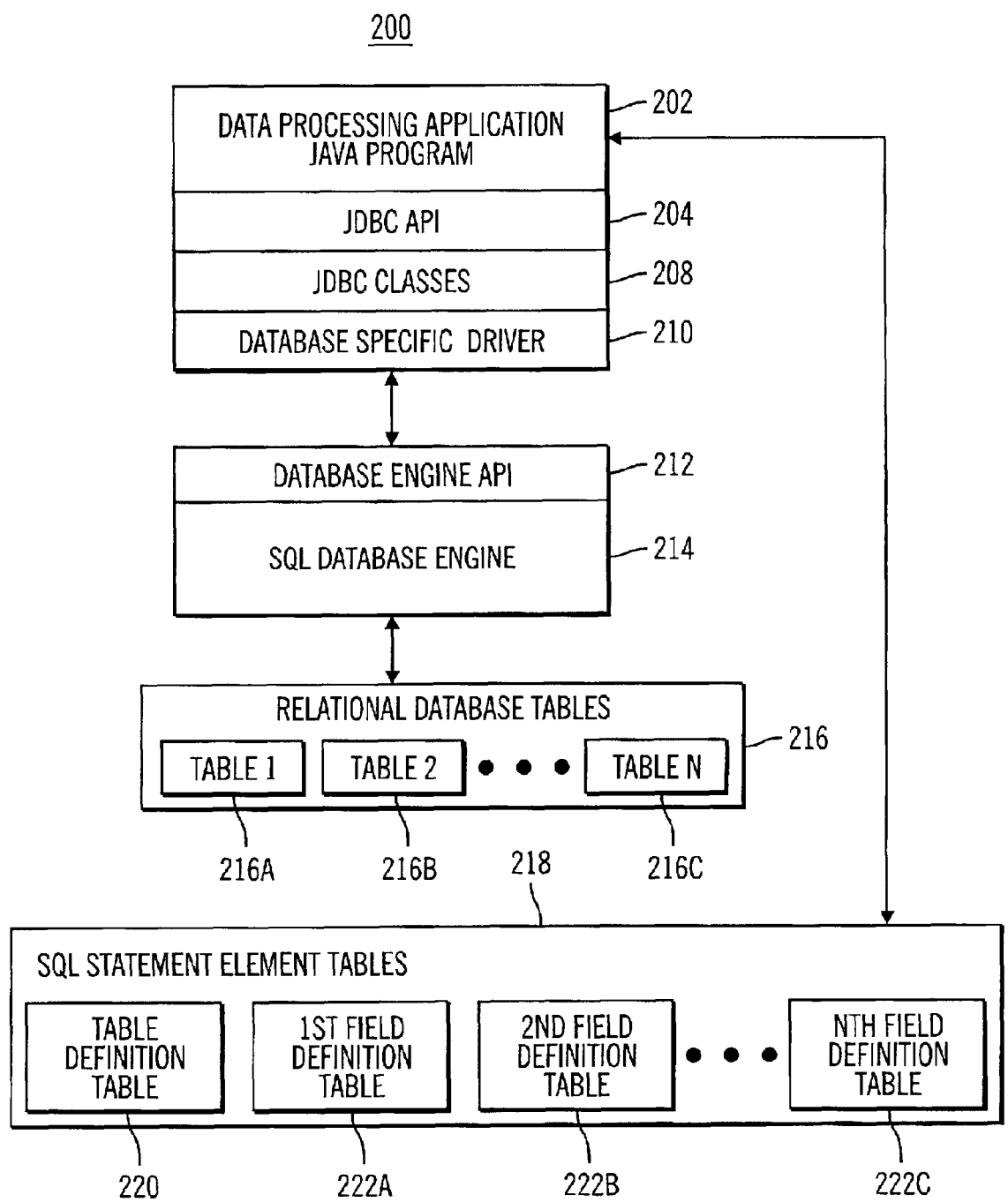
FIG. 2 is a block diagram of a software system according to a preferred embodiment of the present invention.

FIG. 2 is a block diagram of a software system 200 according to a preferred embodiment of the present invention. The software system includes a data processing application 202. The functioning of the data processing application 202 is discussed below with reference to the flow charts. In general terms, the data processing application reads a plurality of query statement elements (preferably in SQL form) from one or more query element tables 218, assembles corresponding query statements from the query statement elements, and causes the query statements to be executed by a query database search engine 214.

According to one embodiment of the present invention, the data processing application operates along with a search engine application program interface (API) 212 through middleware 204, 208, and 210. According to a preferred embodiment of the present invention, the middleware includes a Java Data Base Connectivity module 208 (JDBC) that has a JDBC API 204 and a database specific driver 210. The database specific driver 210 communicates with a search engine API 212.

The database search engine 214 accesses one or more relational database tables 216. As shown in FIG. 2, the database tables include table one 216A, table two 216B, and so on up to an nth table 216C. The number of tables is database dependent. The relational database tables 216 can be stored on the hard disk drive or a remote data storage device. The remote storage device may reside in another computer that is accessed through a network via the network adapter 116.

According to an embodiment of the present invention, the query element tables 218 include a Table Definition Table (TDT) 220 and a plurality of Field Definition Tables (FDTs) 222A, 222B, and 222C. The TDT and FDTs can be stored on a computer-readable medium (such as the removable computer-readable medium 124) or the hard disk drive 108. These tables can be stored in any format including Relational Database Tables. The TDT and FDTs can be accessed and modified using any of a number of commercially available programs for editing tables. They facilitate modification of a database table and obviate the need to edit and recompile source code in order to make modification to queries that would be issued by a data processing program that issues SQL commands.

The TDT 220 includes a plurality of rows. Each row of the TDT 220 includes DML command information (e.g., identification of one or more DML commands to be executed, identification of tables to which the one or more DML commands are to be applied, and identification of FDTs from which lists of command arguments for each DML command are to be obtained). Rows of a table are a form of record, and entries in a row are a form of data field.

FIG. 3 depicts a TDT 220 according to an exemplary embodiment of the present invention. As shown in FIG. 3, each row of the TDT 220 includes information for a series of DML commands (i.e., a SELECT command and an INSERT and/or UPDATE and/or INSERT command). Referring to FIG. 3, a Target Table Name column 302 specifies the name of each table that is to be modified (e.g., by an UPDATE and/or INSERT command) with results obtained from one or more source tables. A Query Table Name column 304 includes names of source tables from which data is to be obtained (e.g., by using a SELECT command). It is to be noted that multiple tables maybe specified if multiple table operations are to be performed, such as a SQL "JOIN" operation. A Query Search Clause column 306 includes selection criteria (e.g., SELECT command WHERE clause arguments) that are to be used in selecting data from the one or many source tables named in the corresponding row of the Query Table Name column 304. The Query Search Clause column 306 may contain selection criteria reflecting multiple source tables if a multiple source tables are specified.

A Target Action column 308 indicates a type of action to be performed in modifying the table named in the Target Table Name column 302 (e.g., UPDATE or INSERT or UPDATE/INSERT). A Fielddef Table Name column 310 identifies by name an FDT (e.g., 222A, 222B, 222C) that includes additional information to be used in composing and processing query, update and/or insert statements for each table in each row of the TDT 220. The additional information includes lists of DML command arguments. These arguments are arranged in columns of each FDT. The Table Seq column 312 includes row numbers for the TDT 220 to ensure that the TDT entries are processed in the proper order.

Figure 4A:
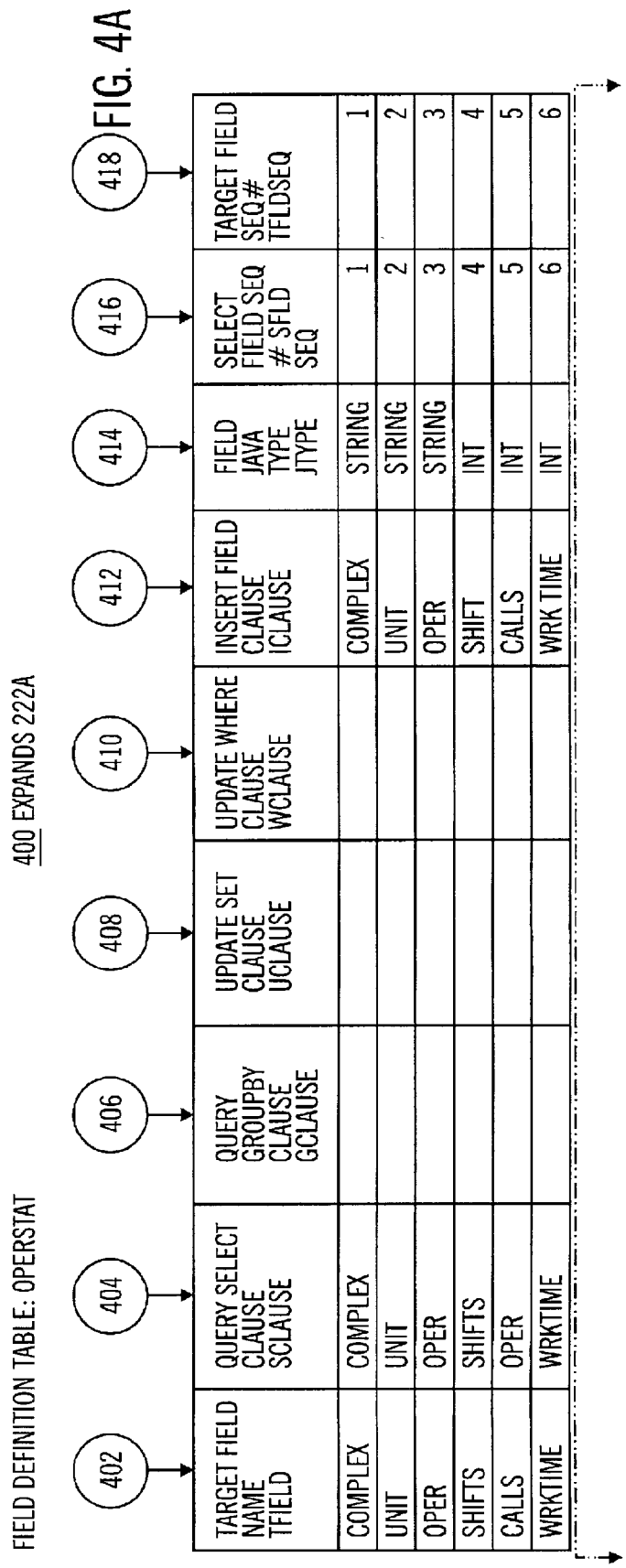
FIG. 4 shows sample Field Definition Tables according example embodiments of the present invention.

FIG. 4 shows three exemplary FDTs 400, 420, and 440 that can be used in conjunction with the TDT 220 shown in FIG. 3. The FDTs 400, 420, and 440 include Target Field Name columns 402, 422, and 442, each of which names one field of a table named in the Target Table Name column 302 that is to be modified based on data in a column retrieved by a query performed on one or more tables named in the Query Table Name column 304. The entries in each Target Field Name column are used to identify each row in the FDT table.

The FDTs 400, 420, and 440 include Query Select Clause columns 404, 424, and 444, each of which specifies a field of the one or more tables named in the Query Table Name column 304 from which data is to be selected. As shown in FDT 420, the Query Select Clause column 424 can also include column operation commands (e.g., 'SUM(Calls)') or operations upon one or more fields that result in a single column. The Query Select Clause column may also contain field specifications that reflect multiple source tables if multiple source table operations are performed, such as SQL "JOIN" operations. The contents of the Query Select Clause columns 404, 424 and 444 are used as arguments to a SELECT command. The FDTs 400, 420, and 440 also include Query Group by Clause columns 406, 426, and 446, each of which specifies a field in the one or more tables named in the Query Table Name column 304 that are used to group records with common entries, for the purpose of column operations. The entries in each of the Query Group by Clause columns 406, 426, and 446 are used as arguments in SELECT command GROUP BY clauses.

The FDTs 400, 420, and 440 also include Update Set Clause columns 408, 428, and 448, each of which can include identifications of a field that is to be modified. The field can be modified by resetting it to a new value, or by combining the new value with the existing value by a mathematical calculation such as addition. The entries in the Update Set Clause columns are used as arguments of a SET clause of a UPDATE command. Update Where Clause columns 410, 430, and 450 include field matching criteria used in combination via AND logic to locate each record in a target table that is to be updated as specified in the Update Set Clause columns. The entries in the Update Where Clause columns 410, 430, and 450 include arguments for UPDATE command WHERE clauses. Insert Field Clause columns 412, 432, and 452 each name the field into which data is to be inserted by INSERT commands.

Field Java Type columns 414, 434, and 454 include entries that indicate the Java data type of internal variables used to store each column of data retrieved from the one or more tables named in the Query Table Name column and used to locate each record to modify and then modify it. Select Field Sequence # columns 416, 436 and 456 indicate which internal variables are to be used to update fields. A single column of retrieved data can be used to update multiple fields. Target Field Sequence # columns 418, 438 and 458 are used to make sure that the rows of the FDTs are processed in the correct order.

Figure 5:
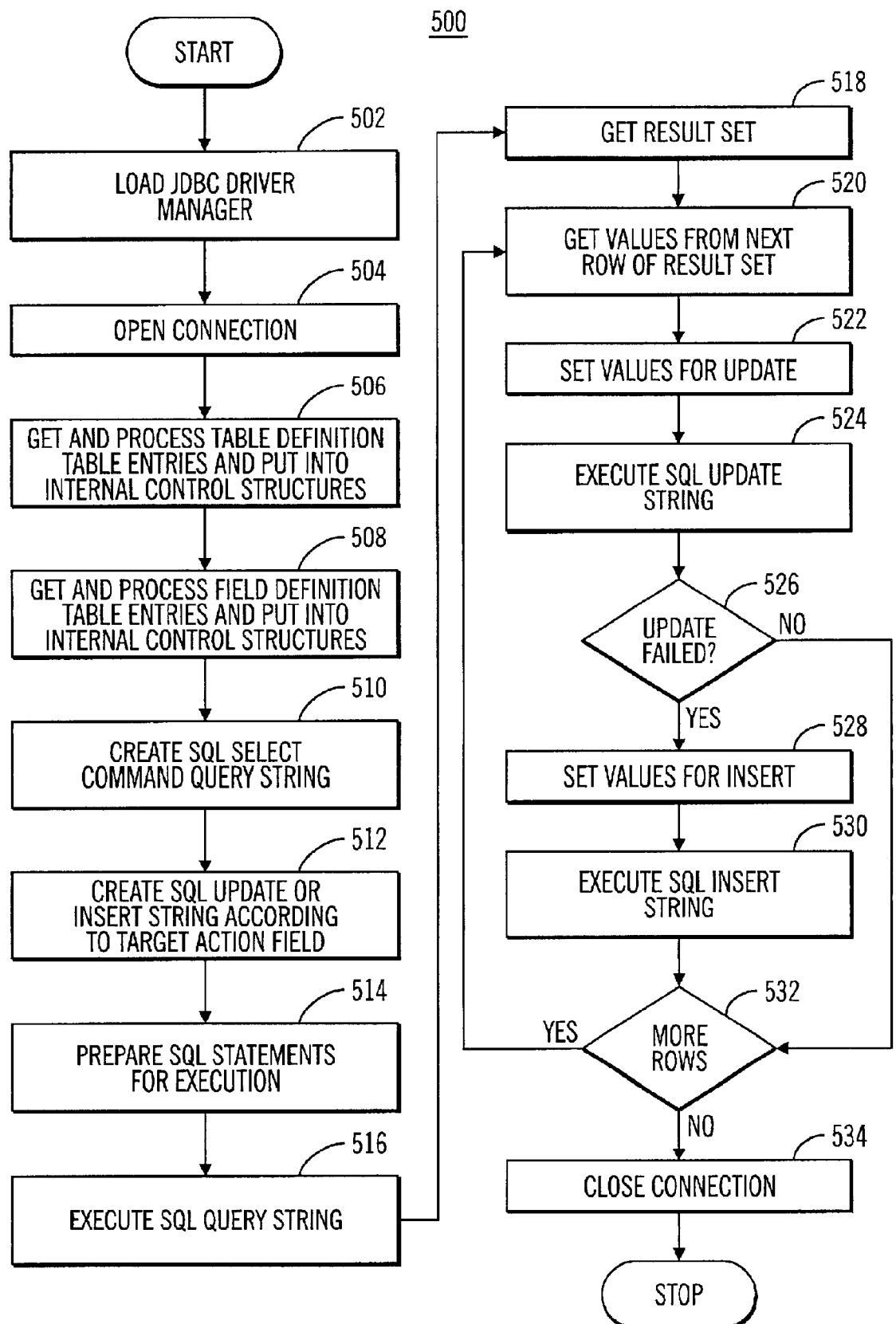
FIG. 5 is a flow chart of a process for performing database operations according to one embodiment of the present invention.

FIG. 5 is a flow chart of a process for performing database operations according to one embodiment of the present invention. The processing illustrated in FIG. 5 includes processing both SQL UPDATE and INSERT commands. A subset of the processing illustrated in FIG. 5 maybe performed according to the processing required by a particular application.

In step 502 of the processing flow illustrated in FIG. 5, a JDBC driver manager is loaded. The JDBC driver manager manages the database specific driver 210. In step 504, the JDBC driver 210 is used to open a connection between the SQL Query database search engine 214 and the data processing application program 202. In step 506, entries are read from the TDT 220. In step 508, entries are read from one or more FDTs 400, 420, and 440. In this embodiment of the invention, the TDT 220 and FDTs 400, 420 and 440 are read in the course of processing the data. Alternative embodiments may read the data from the TDT 220 and FDTs 400, 420 and 440 prior to the processing illustrated in FIG. 5. In step 510, an SQL SELECT command query string is generated from contents of the TDT 220 read in step 506 and one or more of the FDTs 400, 420, and 440 read instep 508. In step 512, SQL UPDATE and/or INSERT strings are composed based on the content of the TDT 220 read in step 506 and the FDTs 400, 420, and 440 read in step 508. The processing performed in step 506 and 508 is illustrated in FIG. 5A through FIG. 5D. The processing performed in step 510 is illustrated in FIG. 6A1 and the processing performed in step 512 is illustrated in FIG. 6B1 through FIG. 6C2.

In step 514, the SQL statements generated in step 512 are prepared for execution. For example, step 514 can be accomplished by using the Connection prepare Statement method. In step 516, a SQL SELECT statement is executed. In step 518, a result set based on the query executed instep 516 is received. For example, steps 516 and 518 can be accomplished using the Statement execute Query and Result Set next methods of JDBC. Instep 520, a next row of a result set returned in step 518 will be read and processed according to the processing described in FIG. 7A below. In step 522, values from an array used for temporary storage of the row of the result set will be set up as described in the processing illustrated in FIG. 8A1, FIG. 8A2, FIG. 8A3 and FIG. 8A4, below. In step 524, a SQL UPDATE command string prepared in step 514 is executed. For example, step 524 can be accomplished by using the Prepared Statement execute Update method of JDBC. Step 526 is a decision block, the outcome of which depends on whether the UPDATE command executed in step 524 failed. Step 526 may be performed to handle the case where there is no record found in the target data table.

If the UPDATE command did not fail, then the process 500 jumps to step 532. If the UPDATE command failed, then in step 528 values from an array used for temporary storage of the row of the result set will be set for an INSERT command as described in the processing illustrated in FIG. 9A and FIG. 9B, below. In step 530 an INSERT command that uses the row entries stored in the array will be executed. For example, step 530 can be accomplished by using the Prepared Statement execute Update method of JDBC. In decision block 532, a determination is made as to whether there are more rows in the result set obtained in step 518 that are yet to be processed. If so, then the process 500 loops back to step 518. If not, then the process 500 continues with step 534 in which the connection opened in step 504 is closed.

Queries are maintained in such a way that they are accessible to both a program which drives a database application with the queries, and a database administrator who can edit the tables to affect modifications as necessary.

Figure 5A:
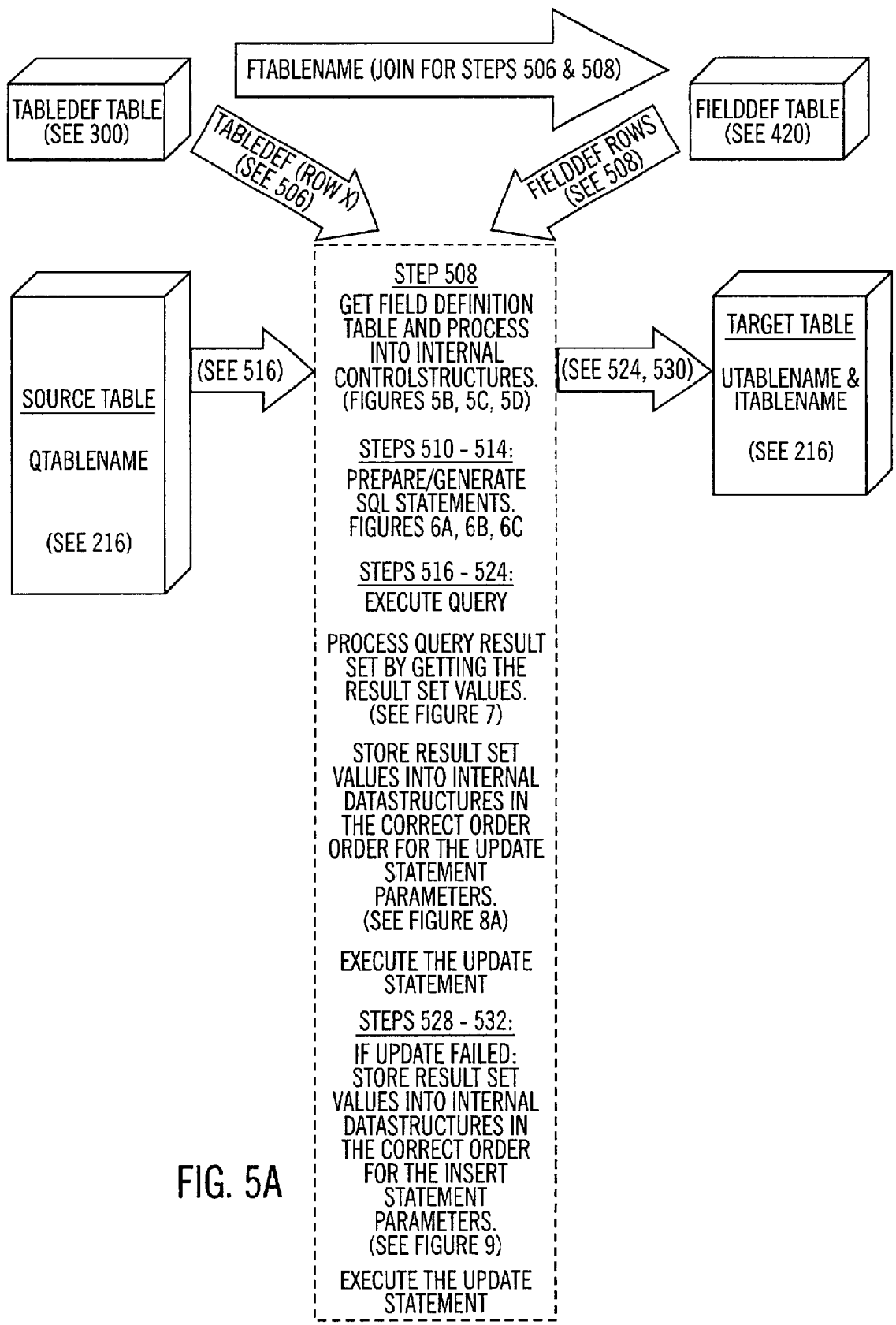
FIG. 5A illustrates the data flow and processing of data in an example database according to one embodiment of the present invention.

FIG. 5A schematically illustrates the data flow into and out of the processing performed by the invention. The initial data into the processing is obtained during step 506 wherein the data from the TDT 220 is retrieved. The data retrieved from TDT 220 is used to determine from which FDT 222A, 222B and/or 222C to obtain data. The data retrieved from the TDT 220 and FDTs 222A, 222B and 222C is used to determine the processing to be performed on the data in the one or more source tables and how that data will be transformed and stored in the target table, as is described herein. Each row of the TDT 220 specifies a particular operation to be executed by the present invention.

FIG. 5B1 through FIG. 9B illustrate an example of the processing performed by the present invention by showing detailed processing that is associated with the specific data shown in the second row of the TDT 220 that is illustrated in FIG. 3. This second row of the TDT 220 will result in database record fields being modified in the "UnitStat" (the target data table) as specified in column 302. The database record fields will be modified in accordance with the data contained in the "UnitStatTab" FDT 420 as is specified in column 310. That data will then be processed by the program executing the present invention to perform the "Target Actions" commands specified in column 308 of the TDT 220, namely "Update/Insert" in this example.

The processing shown in FIG. 5B1 through FIG. 9B illustrate processing within the example embodiment which uses JDBC and SQL database commands. The processing utilizes arrays internal to the Java program, JDBC methods such as "getInt, "getString," "setInt" and "setString."

FIG. 5B1 shows the Select Command String 550 which is used to retrieve the data from the Fielddef Table specified in the second row of TDT 220. The Select Command 550 is executed to retrieve the specification of the various arguments that will be incorporated into the SQL SELECT command that will be executed upon the one or more Source data tables. The fields retrieved by Select Command String 550 include "SCLAUSE," which are one or more data fields (or data fields processed by SQL commands) to be extracted from the one or more source data tables by the SELECT command; "Jtype," which are the corresponding Java data types of the data in the fields specified in the "SCLAUSE"; and "SfldSeq," which is the sequence number of the data row as stored in the FDT. The inclusion of SQL commands such as SUM( ) in the SCLAUSE column allows data reduction to be performed on the source data without modification of the Java or other programming used to implement the present invention. The SELECT command includes the "Where SCLAUSE is NOT NULL" clause so that only rows of the FDT 400, 420 or 440 that have SCLAUSE rows specified are returned. In the illustrated embodiment of the present invention, the select command string 550 is predetermined based on the FDT table schema with the name of the FDT table substituted at time of execution.

These three columns of data retrieved from the FDT after execution of the Select Command String 550 are then stored into three data arrays that are internal to the program of the present invention. The data are stored in the arrays by execution of the SClause algorithm 551, which is shown in FIG. 5B1. The SClause algorithm 551 extracts the data in each column of the result set obtained by execution of the Select Command String 550 into separate arrays with array indices that correspond to the row of the result set. The transfer of data from the result set into the corresponding arrays is illustrated schematically in FIG. 5B2. These data items are transferred into these arrays by processing the individual rows in the result set, as shown in SClause algorithm 551. These arrays are used to construct the SELECT clause 604 which will be executed on the one or more source data tables. Construction of that SELECT clause is shown in FIG. 6A1 and FIG. 6A2.

FIG. 5B3 illustrates processing used to generate the Group By Clause 612, as shown in FIG. 6A1 and FIG. 6A2, which is to be incorporated into the Select command string that will ultimately retrieve data from the one or more source data tables. The Group By Clause information is stored in column 426 of the specified FDT 420. The Select statement 556 is executed and the result set contains the columns containing the Group By clause strings to be included in the retrieval command as well as the SFldSeq field sequence number as was retrieved by Select Command String 550. The processing of algorithm 556 places the Group By clause string into the GClause[ ] array with indices that correspond to the row of the result set.

FIG. 5C1 and FIG. 5C2 illustrate the processing used to develop the Update Set Clause 628 of the SQL Update statement that will be used to modify data in the target data table. Line 2 of TDT 220 identifies the target data table as UnitStat in Column 302. The Select Command String 565 retrieves the data from the specified FDT 420 to be used to create the Update Set Clause. The data are then loaded into local program data arrays as is shown in algorithm 566. The SFldSeq 436 indices are used to specify which column of source data is to modify a target field. This allows one source field to be used to modify multiple target fields. The results of the Select Command String 565 are sorted into the proper order by the TFldSeq 438. An internal variable UFldSeq is created with the index of each row retrieved from the result set of the Select Statement 565. This is used to store the data retrieved into the correct parameter of the Update Statement. It is to be noted that the "source data" may include data processed by SQL commands in the retrieving select statement, such as "SUM( )."

FIG. 5C3 and FIG. 5C4 illustrate the processing which retrieves the data used to build the "Where" clause 632 of the Update command, as is shown in FIG. 6B1. The Where clause algorithm 575 transfers the data retrieved by the SELECT command 574 into the arrays as is shown in FIG. 5C4. An internal variable WFldSeq is created with the index of each row retrieved from the result set, incremented by the number of rows that were retrieved in FIG. 5C1 to process the Update Set Clause. The parameters in the Where clause of the Update statement are assigned after the parameters of the Update Set Clause.

The processing which retrieves and processes the data used to construct the Insert command is shown in FIG. 5D1 and FIG. 5D2. FIG. 5D1 illustrates the processing steps of algorithm 581 which will transform the data retrieved by the SELECT command 580 into the arrays, as is shown in FIG. 5D2.

FIG. 6A1 is a pseudo code schematic 600 illustrating the processing of code which constructs a SELECT query string to operate upon the one or more source data tables 216 from the contents of a row of the TDT 220 and the FDT named in the row according to one embodiment of the present invention. The pseudo code 600 is executed for each row of the TDT 220. The schematic shows a number of string literals, variables that contain string values, and segments of code that return lists of strings (e.g., lists of DML command arguments). All the strings are to be concatenated together to form a SELECT query string.

Element 602 is the DML token "SELECT". Block 604 is a segment of code that determines the number of rows in the Query Select Clause column of the FDT 400, 420, or 440 named in the Fielddef tablename column 310, and extracts all the entries from that row into a comma delimited list. The SClause[ ] array was constructed using the processing shown in FIGS. 5B1 through 5B2. Element 606 is the literal 'FROM' that forms a part of the SELECT query string. Element 608 is the variable 'Qtablename' that points to an entry of the Query tablename column 304 of the row of the TDT 220 being processed by the pseudo code 600. Block 610 includes a segment of code that extracts an entry from the current row of the Query Search Clause column 306 of the TDT 220. If the entry is not empty, a literal string 'WHERE' is appended in front of the entry. Block 612 includes a segment of code that extracts non null values from the Query Group by Clause 426 column of the FDT 420 named in the Fielddef Tablename column 310 of the current row of the TDT 220 into a comma delimited list prefixed with the literal 'GROUP BY'. FIG. 6A2 shows the SELECT query string constructed using the example of row 2 of the TDT 220 shown in FIG. 3.

FIG. 6B1 is a pseudo code 620 schematic of a process for constructing an UPDATE command string from the contents of a row of the TDT 220 and the FDT named in the Fielddef TableName column of the row of the TDT 220 according to one embodiment of the present invention. This pseudo code 620 is executed for each row of the TDT 220 for which the entry in the Target Action column 308 of the Table Definition Table 220 is UPDATE or UPDATE/INSERT.

Element 622 is the SQL DML token 'UPDATE.' Utablename 624 is a variable that points to an entry in the current row of the Target Table Name column 302 of the TDT 220. Element 626 is the SQL syntax literal 'SET'. Block 628 is a code segment that extracts all the entries in the Update Set clause column 408, 428, or 448 of the FDT 400, 420, or 440 named in the Fielddef TableName column 310 of the current row of the TDT 220 into a comma delimited list. Element 630 is the SQL syntax token 'WHERE.' Block 632 is a code segment that extracts all the entries in the Update Where Clause column 430 of the FDT 420 named in the current row of the TDT 220. Each entry is appended into the Update string with the SQL syntax literal 'AND' inserted between entries. FIG. 6B2 shows an example Update command string using line 2 of the TDT 220 shown in FIG. 3.

FIG. 6C1 is a pseudo code schematic 640 of a process for constructing an INSERT command string from the contents of tables according to one embodiment of the present invention. Element 642 is the SQL syntax literal 'INSERT INTO.' Itablename 644 is a variable that points to an entry in the current row of the Table Target Name column 302 of the TDT 220. A literal '(' is appended after the Itablename. Block 646 is a code segment that extracts entries from the Insert Column Name column 412, 432, or 452 of the FDT 420, 420, or 440 named in the current row of the TDT 220 into a comma delimited list. Element 648 is the SQL syntax literal ')VALUES('. Block 650 is a code segment used to generate a comma delimited string of the literal '?'. The number of '?' in the string is determined by the variable Isize, which is the number of fields in the Insert Field Clause. Element 652 is a literal ')' to properly terminate the VALUES argument. FIG. 6C2 shows the example INSERT command string generated by processing line 2 of the example TDT 220 shown in FIG. 3.

The processing described above, which creates the command strings, is performed prior to execution of those strings. FIG. 5 illustrates the processing whereby the processing shown in FIG. 5B1 through FIG. 6C2 is performed in steps 506 through 514. Once these SQL command strings are formed, the data query (Select) command is executed instep 516. Steps 518 through 522 and step 528 perform processing of data in the result set prior to the insertion of data into the target data table through Update commands, as shown in step 524, or insert commands as in step 530. This processing of the data retrieved from the source data table prior to insertion into the target data table is described below.

Figures 7A, 7B:
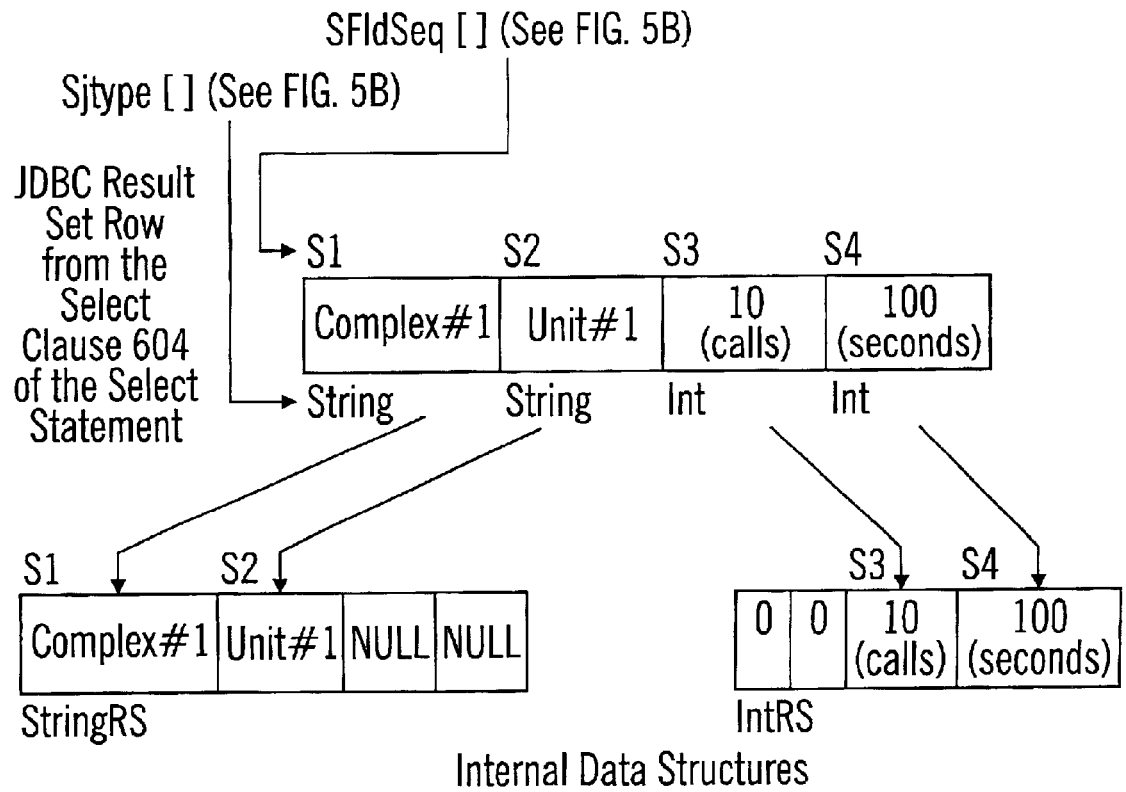
FIG. 7A and FIG. 7B illustrate the processing flow used to transfer into internal data storage the data in the result set that was retrieved from the source data tables.

FIG. 7A describes the processing used to transfer into internal data storage the data in the result set that was retrieved from the source data table by executing the SELECT query string constructed as shown in FIG. 6A1. The result set data are stored in internal data storage with an ordering that is specified in the array SFldSeq[ ] as shown in FIG. 7A. The values in the result set may be retrieved using the JDBC methods "getString" and "getInt". The processing of the data in the result set produces two arrays, StringRS and IntRS, which contain string and integer values, respectively, that are retrieved by the Select clause. The transfer of a row of data from the result set is illustrated in FIG. 7B. Each row of the result set is processed in turn.

FIG. 8A1 and FIG. 8A2 illustrate the processing used to bind the parameters of the Update Command string to the data stored in the internal data structures created with the processing illustrated in FIG. 7A. The algorithms shown in FIG. 8A1 and FIG. 8A2 are executed to bind the parameters of the Update_Set clause 628 and the Where Clause 632 of the update statement shown in FIG. 6B1. The data stored in internal variables maybe bound to parameters by loading their values into a JDBC structure using the JDBC methods "setString" and "setint." The result of the processing is illustrated in FIG. 8A3 and FIG. 8A4.

Figures 9A, 9B:
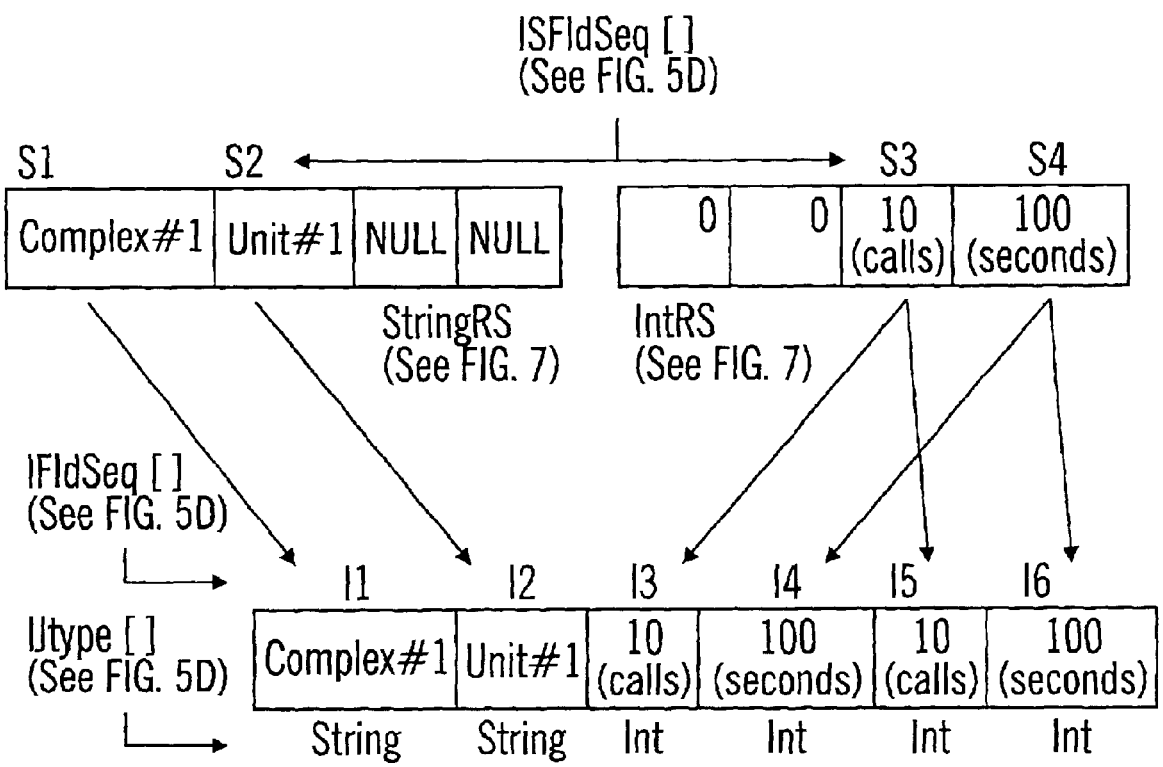
FIG. 9A and FIG. 9B illustrate the processing used to bind the parameters of the Values Clause 650 of the Insert Command string to the data stored in the internal data structures created with the processing illustrated in FIG. 7A and FIG. 7B.

FIG. 9A and FIG. 9B illustrate the processing used to bind the parameters of the Values Clause 650 of the Insert Command string to the data stored in the internal data structures created with the processing illustrated in FIG. 7A. The algorithm shown in FIG. 9A is executed to bind the parameters of the Values clause 650 of the Insert statement shown in FIG. 6C1 and FIG. 6C2. The data stored in internal variables maybe bound to parameters by loading their values into a JDBC structure using the JDBC methods "setString" and "setInt." The result of the processing is illustrated in FIG.9B.

In a preferred embodiment, the processing and algorithms described above with reference to the figures are read from the computer readable medium 124 and executed by the microprocessor 102.

The present invention realizes a system in which elements of query strings can be stored in tables and accessed at run time to compose database commands. The present invention is advantageous for data processing that entails numerous complex database commands, because modification can be more easily accomplished by altering selected TDT or FDTs, as opposed to rewriting SQL commands.

The present invention can be realized in hardware, software, or a combination of hardware and software. Any kind of computer system—or other apparatus adapted for carrying out the methods described herein—is suited. A typical combination of hardware and software could be a general purpose computer system with a computer program that, when being loaded and executed, controls the computer system such that it carries out the methods described herein.

The present invention can also be embedded in a computer program product, which comprises all the features enabling the implementation of the methods described herein, and which—when loaded in a computer system—is able to carry out these methods. Computer program means or computer program in the present context means any expression, in any language, code or notation, of a set of instructions intended to cause a system having an information processing capability to perform a particular function either directly or after either or both of the following a) conversion to another language, code or, notation; and b) reproduction in a different material form.

Each computer system may include, inter alia, one or more computers and at least a computer readable medium allowing a computer to read data, instructions, messages or message packets, and other computer readable information from the computer readable medium. The computer readable medium may include non-volatile memory, such as ROM, Flash memory, Disk drive memory, CD-ROM, and other permanent storage. Additionally, a computer medium may include, for example, volatile storage such as RAM, buffers, cache memory, and network circuits. Furthermore, the computer readable medium may comprise computer readable information in a transitory state medium such as a network link and/or a network interface, including a wired network or a wireless network, that allow a computer to read such computer readable information.

While there has been illustrated and described what are presently considered to be the preferred embodiments of the present invention, it will be understood by those skilled in the art that various other modifications maybe made, and equivalents may be substituted, without departing from the true scope of the invention. Additionally, many modifications maybe made to adapt a particular situation to the teachings of the present invention without departing from the central inventive concept described herein. Therefore, it is intended that the present invention not be limited to the particular embodiments disclosed, but that the invention include all embodiments falling within the scope of the appended claims.

What is claimed is:

1. A method for performing database operations, the method comprising the steps of:
    reading, from a first set of database tables by executing a first database query command string, a first plurality of elements, the first plurality of elements comprising at least one database query language command and at least one database query command argument;
    assembling the first plurality of elements that were read from the first set of database tables into a, query string comprising a second database query command string to be executed by a database search engine on a second set of database tables; and
    executing the query string as a second database query command string on the database engine to retrieve a results set from the second set of database tables;
    wherein the first set of database tables comprises a first query element database table and a second query element database table, and wherein the step of reading comprises the sub-steps of:
    reading, by executing a second database query command string, a name of the second query element database table from the first query element database table; and
    reading, from the second query element database table by executing a third database query command string, a plurality of arguments to be assembled into the query string.

2. The method according to claim 1, wherein the step of assembling the query string includes the sub-step of assembling a query string that includes a first database query language command and the plurality of arguments.

3. The method according to claim 1, wherein the step of reading the first plurality of elements further includes the sub-step of reading, from the first set of database tables, one or more names, of database tables within the second set of database tables from which the results set is to be retrieved by executing the query string.

4. The method according to claim 1, wherein the sub-step of reading a first plurality of arguments includes the sub-step of reading a plurality of names of columns within database tables in the second set of database tables, the plurality of names of columns to be incorporated into the query string to specify data to retrieve for the results set.

5. The method according to claim 4, wherein the step of assembling the query string includes the sub-step of concatenating together the first plurality of elements that include the plurality of names of columns.

6. The method according to claim 1, further comprising the step of reading a further database query language command from the first query element database table.

7. The method according to claim 6, further comprising the step of reading a plurality of names of columns of a target data database table from the second query element database table, wherein the target data database table is to receive the results set and the plurality of names of columns are to be included into a database command string.

8. The method according to claim 7, wherein the step of assembling the query string includes the sub-step of concatenating together a second plurality of elements that include the further database query language command and the plurality of names of columns of the target data database table.

9. A method according to claim 1, further comprising the steps of:
    reading a second plurality of elements of a database query language query from a third set of database tables;
    assembling a data base table storage command string from the second plurality of elements and
    executing the data base table storage command string in order to modify a target data table with the results set.

10. A method according to claim 9, wherein said storage command string is Structured Query Language UPDATE command string.

11. A method according to claim 9, wherein said storage command string is Structured Query Language INSERT command string.

12. A method according to claim 9, wherein one or more query element database tables in said third set of database tables is also in said first set of database tables.

13. A method according to claim 9, wherein said second plurality of elements contain database query language elements used in database query command strings that specify the location in which data elements are to be stored in the target data database table.

14. A method according to claim 9, further comprising the step of executing said storage command string so as to cause all or a part of said results set to be stored.

15. A machine-readable medium encoded with a program for performing database operations, said program containing instructions for performing the steps of:

reading, from a first set of database tables by executing a first database query command string, a first plurality of elements, the first plurality of elements comprising at least one database query language command and at least one database query language command argument;

assembling the first plurality of element that were read from the first set of database tables into a, query string comprising a second database query command string to be executed by a database search engine on a second set of database tables; and executing the query string as a second database query command string on the database engine to retrieve a results set from the second set of database tables;

wherein the first set of database tables comprises a first query element database table and a second query element database table, and wherein the step of reading comprises the sub-steps of:

reading, by executing a second database query command string, a name of the second query element database table from the first query element database table; and reading, from the second query element database table by executing a third database query command string, a plurality of arguments to be assembled into the query string.

16. The computer readable medium according to claim 15, wherein the step of assembling the query string includes the sub-step of assembling a query string, that includes a first database query language command and the plurality of arguments.

17. The computer readable medium according to claim 15, wherein the step of reading the first plurality of elements further includes the sub-step of reading, from the first set of database tables, one or more names, of database tables within the second set of database tables from which the results set is to be retrieved by executing the query string.

18. The computer readable medium according to claim 15, wherein the step of reading a first plurality of arguments includes the sub-step of reading a plurality of names of columns within database tables in the second set of database tables, the plurality of names of columns to be incorporated into the query string to specify data to retrieve for the results set.

19. The computer readable medium according to claim 18, wherein the step of assembling the query string includes the sub-step of concatenating together the first plurality of elements that include the plurality of names of columns.

20. The computer readable medium according to claim 15, wherein the program further contains instructions for performing the step of reading a further database query language command from the first query element database table.

21. The computer readable medium according to claim 20, wherein the step of reading a plurality of arguments for the query language command from the second query element table includes the sub-step of reading a plurality of names of columns of a target data database table from the second query element database table, wherein the target data database table is to receive the results set and the plurality of names of columns are to be included into a database command string.

22. The computer readable medium according to claim 21, wherein the step of assembling the query string includes the sub-step of concatenating together a second plurality of elements that include the further database query language command and the plurality of names of columns of the target data database table.

23. The computer readable medium according to claim 15, wherein the program further contains instructions for performing the steps of:

reading a second plurality of elements of a database query language query from a third set of database tables;

assembling a data base table storage command string from the second plurality of elements; and executing the data base table storage command to modify a target data database table with the results set.

24. The computer readable medium according to claim 23, wherein said storage command string is Structured Query Language UPDATE command string.

25. The computer readable medium according to claim 23, wherein said storage command string is Structured Query Language INSERT command string.

26. The computer readable medium according to claim 23, wherein one or more query element database tables in said third set of database tables is also in said first set of database tables.

27. The computer readable medium according to claim 23, wherein said second plurality of elements contain database query language elements used in database query command strings that specify the location in which data elements are to be stored in the target data database table.

28. The computer readable medium according to claim 23, wherein the program further contains instructions for performing the step of executing said storage command string so as to cause all or a part of said results set to be stored.

29. A data processing system comprising:

a storage device for storing a relational database; and a processor programmed to:
   read, from a first set of database tables by executing a first database query command string, a first plurality of elements, the first plurality of elements comprising at least one database query language command argument and at least one database query assemble the first plurality of elements that were read from the first set of database tables into a query string comprising a second database query command string to be executed by a database search engine on a second set of database tables; and execute the query string as a second database query command string on the database engine to retrieve a results set from the second set of database tables;

wherein the processor is further programmed to:

read a second plurality of elements of a database query language query from a third set of database tables;

assemble a data base table command string from the second plurality of elements; and execute the data base storage command to modify a target data database table with the result set.

30. A data processing system comprising:

means for storing one or more data tables;

means for reading, from a first set of database tables by executing a first database query command string, a first plurality of elements, the first plurality of elements comprising at least one database query language command argument and at least one database query command argument;

means for assembling the first plurality of elements that were read from the first set of database tables into a query string comprising a second database query command string to be executed by a database search engine on a second set of database tables; and means for executing the query string as a second database query command string on the database engine to retrieve a results set from the second set of database tables;

means for reading a second plurality of elements of a database query language query from a third set of database tables;

means for assembling a data base table command string from the second plurality of elements; and means for executing the data base storage command to modify a target data database table with the result set.

* * * * *